United States Patent [19]
Yindra et al.

[11] 3,888,444
[45] June 10, 1975

[54] ADJUSTABLE SUPPORT COLUMN

[75] Inventors: Leonard J. Yindra, Manitowoc; Robert A. Karl, Kewaunee, both of Wis.

[73] Assignee: American Hospital Supply Corporation, Evanston, Ill.

[22] Filed: July 26, 1971

[21] Appl. No.: 165,962

[52] U.S. Cl. ......... 248/188.5; 308/3 R; 308/DIG. 7
[51] Int. Cl. ........................................ F16m 13/00
[58] Field of Search ............ 248/161, 188.2, 188.5; 108/144, 147; 312/341 NR; 308/3 R, 3.6, DIG. 7

[56] References Cited
UNITED STATES PATENTS

| | | | |
|---|---|---|---|
| 664,453 | 12/1900 | Ambrose | 308/3.5 |
| 2,702,730 | 2/1955 | Ivanoff et al. | 308/DIG. 7 |
| 2,815,252 | 12/1957 | Baker | 308/3.6 |
| 2,947,556 | 8/1960 | Wenger | 248/161 X |
| 3,361,510 | 1/1968 | McDermott | 248/404 X |
| 3,521,341 | 7/1970 | Hornlein et al. | 248/161 X |
| 3,543,282 | 11/1970 | Sautereau | 108/144 |

FOREIGN PATENTS OR APPLICATIONS

| | | | |
|---|---|---|---|
| 241,740 | 8/1965 | Austria | 108/144 |
| 729,351 | 5/1955 | United Kingdom | 308/DIG. 7 |
| 1,058,716 | 6/1959 | Germany | 248/405 |

*Primary Examiner*—William H. Schultz
*Attorney, Agent, or Firm*—Dawson, Tilton, Fallon & Lungmus

[57] ABSTRACT

An adjustable support column particularly suitable for use in the construction of tables, such as pedestal drafting tables, in which vertical adjustability and a high degree of stability are required. The column comprises a pair of telescoping tubular members of rectangular cross section, the inner member having a plurality of vertically-elongated self-adjusting bearing strips or pads which slidably engage the inside corners of the outer tubular member.

12 Claims, 4 Drawing Figures

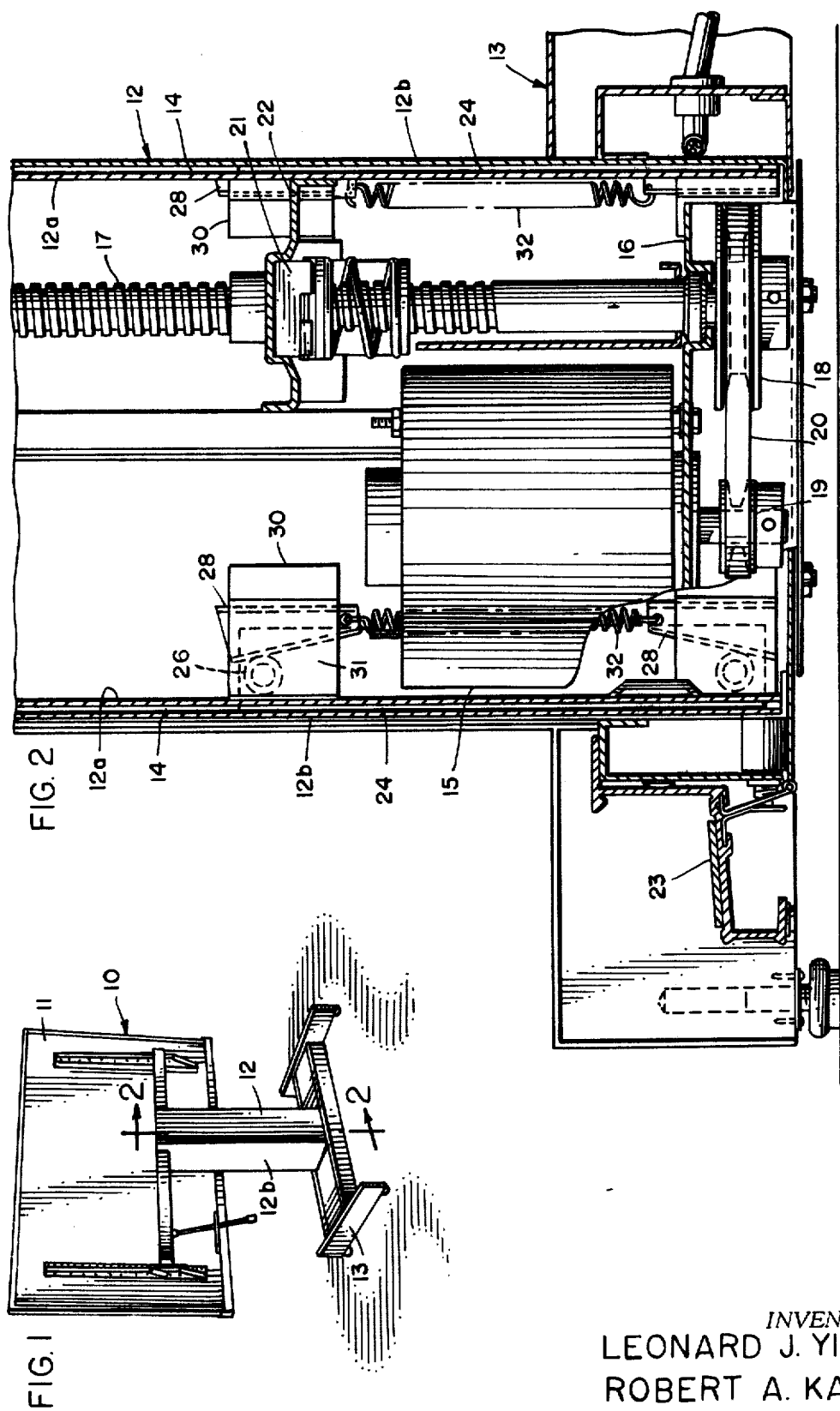

PATENTED JUN 10 1975 3,888,444

SHEET 2

INVENTORS:
LEONARD J. YINDRA
ROBERT A. KARL
BY: Dawson, Tilton, Fallon & Lungmus
ATT'YS

ADJUSTABLE SUPPORT COLUMN

BACKGROUND

While telescoping tubular members are commonly used where extendability and retractability are desired, such as arrangement for pedestal bases has not been suitable in the past for supporting drafting tables and other support surfaces which must be free of even slight wobbling or tipping movement. Telescoping tubes which are free of all looseness usually fit too tightly to slide easily, if at all. Furthermore, slight surface irregularities in the tubes may produce jamming, rapid wear, and damage to the parts even where roller or ball bearings are used to reduce frictional resistance.

SUMMARY

The present invention is concerned with a support column in which the telescoping tubular members operate smoothly and quietly and are essentially free of all play that might result in a detectable wobble in a supporting surface carried by the column. The column is therefore particularly suitable for use in the construction of variable height drafting tables and the like wherein even a slight wobbling action would be objectionable.

A particularly important aspect of the invention lies in providing a vertically adjustable column which is not only substantially wobble-free in operation but which achieves that objective despite slight dimensional variations in the parts. The self-adjusting bearings cooperate with the other elements of the column to accommodate such dimensional variations without causing jamming, binding, damage, or excessive wear. Moreover, the extension and retraction of the column is relatively quiet, without the noise commonly associated with the operation of roller or ball bearings.

The support column comprises telescoping outer and inner tubes, each of generally uniform rectangular cross section. The external cross sectional dimensions of the inner tube are sufficiently smaller than the internal cross sectional dimensions of the outer tube to define perimetric spacing therebetween. Within such spacing are a plurality of vertically elongated plastic bearing strips which are adjustably mounted upon the inner tubular member and having straight vertical edges bearing against the inside surfaces of the outer tubular member at the corners thereof. The strips are self-adjusting in one direction; that is, they are capable of limited movement towards the inside corners of the outer tubular member but are firmly locked against return movement. Each strip is provided with a pair of studs at its upper and lower ends which project into the inner tubular member through enlarged openings therein. Wedge elements, slidable along shoulders provided within the inner tubular member, bear against the studs and cam the bearing strips into firm engagement with the inside corners of the outer tubular member. Two such wedging elements are provided for each bearing strip and are urged together by a tension spring extending therebetween.

DRAWINGS

FIG. 1 is a perspective rear view of a drafting table having a pedestal base embodying the adjustable column construction of the invention;

FIG. 2 is an enlarged fragmentary vertical sectional view taken along line 2—2 of FIG. 1;

DESCRIPTION

Figure 4:
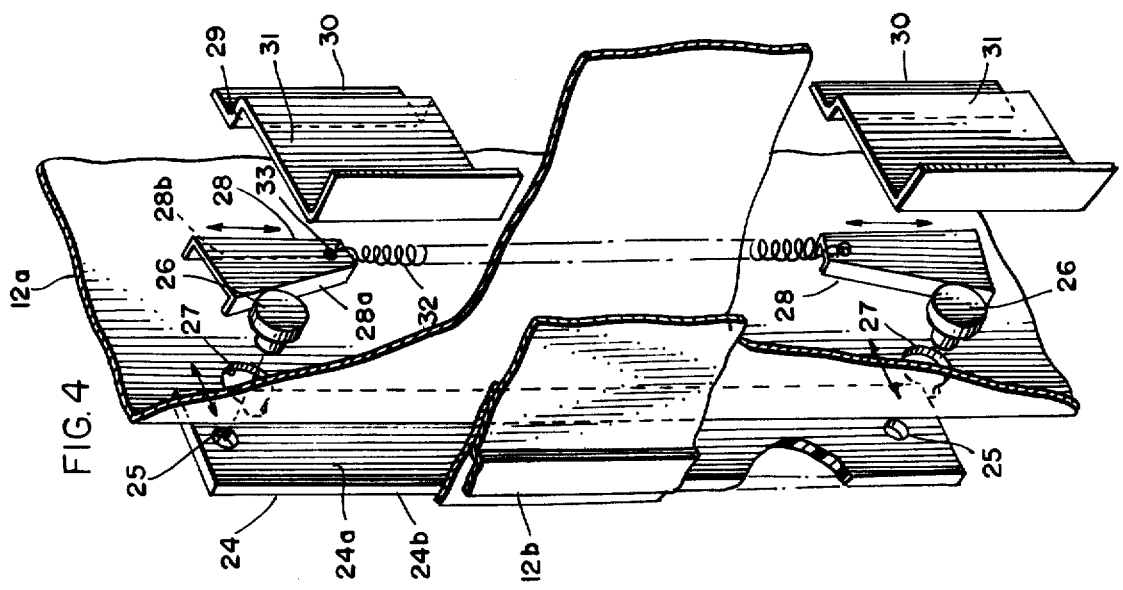
FIG. 4 is a fragmentary exploded perspective view illustrating the construction of a self-adjusting bearing and its relationship to the inner and outer tubular members.

Referring to the drawings, FIG. 1 illustrates a pedestal drafting table 10 having a table top 11, an expandable column 12, and a base 13. The lower end of the column is secured to the base which is in turn adapted to rest upon a floor surface. In the illustration given, the table top is pivotally mounted upon the upper end of the column for movement between the generally vertical position shown, a generally horizontal position, and any of a variety of angular positions between those extremes. While the support column 12 is particularly suitable for use in connection with a drafting table of the type shown, it is to be understood that such column may be used with any table or support structure in which a wide range of vertical adjustability is desired but in which even a slight amount of wobble or looseness cannot be tolerated.

Figure 3:
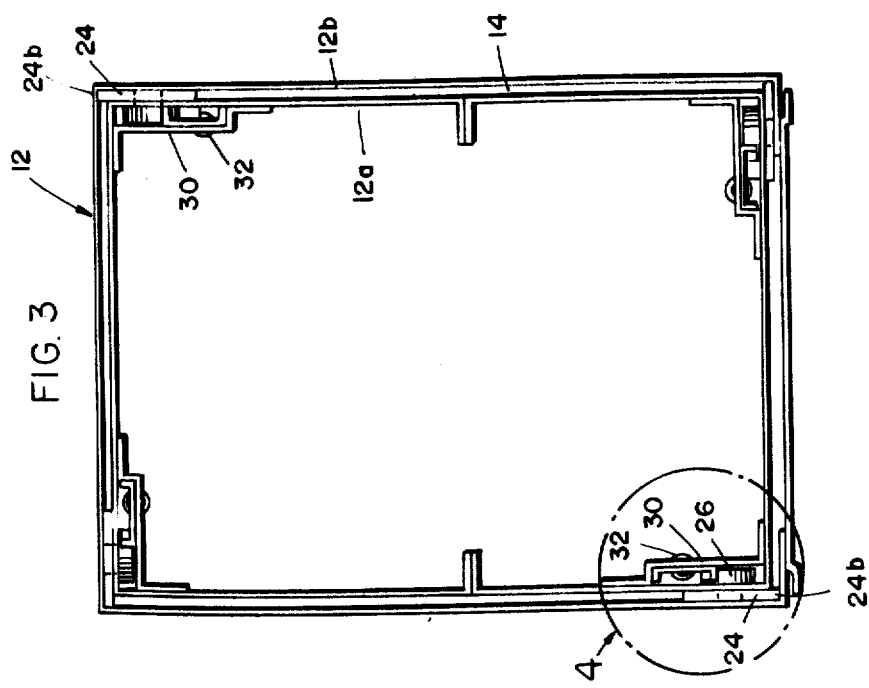
FIG. 3 is a simplified top plan view of the column showing the relationship of the inner and outer tubular members but omitting the operating mechanism for expanding and retracting the column, for clarity of illustration.

Column 12 includes an inner tubular member 12a and an outer tubular member 12b, the two members being telescopingly arranged as clearly illustrated in FIGS. 1–3. Both members are hollow and are generally rectangular in horizontal cross section. It is to be noted that the inside dimensions of the outer tube 12b are sufficiently greater than the outside dimensions of the inner tube 12a to define a perimetric space 14 of substantially uniform width between the two members (FIG. 3). Thus, the opposing wall surfaces of the two tubular members do not directly engage each other despite the telescoping arrangement of those members.

In the embodiment illustrated in the drawings, outer tube 12b has its lower end secured to base 13 and inner tube 12a has its upper end connected to table top assembly 11. It will be apparent as the specification proceeds that the arrangement might be reversed; that is, the outer tube might be connected to the table top and the inner tube might be affixed to the base. In either case, raising of the table top is achieved by expansion of the support column, and lowering of the top occurs when the support column contracts. Such expansion and contraction of the column may be achieved by an electric motor 15 supported by a plate 16 secured within the lower end of tubular member 12b and operatively connected to a vertical screw shaft 17 by means of pulleys 18–19 and belt 20. A nut 21 is threadedly carried by the screw shaft and is connected by horizontal plate 22 to the inner tubular column member 12a. Consequently, when the reversible electric motor 15 is driven in one direction, tubular member 12a is raised and when the motor is reversed member 12a is lowered. Operation of the motor may be conveniently controlled by foot pedals such as the pedal 23 illustrated in FIG. 2.

Referring to FIGS. 3 and 4, it will be seen that the bearing elements which guide relative movement of the inner and outer tubular sections consist of a plurality of vertically-elongated bearing strips or pads 24. Each strip is rectangular in vertical section, has flat opposing side faces 24a, and is provided with a straight narrow edge 24b. A pair of openings 25 are provided in the strip adjacent opposite ends thereof and inwardly projecting studs 26 are secured in each of the openings. A pair of enlarged openings 27 are provided in each wall of the inner rectangular member 12a, the studs projecting inwardly through such openings and having their cylindrical head portions disposed within the interior of the inner column member. It will be observed from the drawings that openings 27 are sufficiently larger than studs 26 to permit limited horizontal movement of strip 24 in directions normal to the axes of the studs and that each strip in its operative position has its inner face 24a in surface engagement with an outer surface of one wall of the rectangular inner column member and has its edge portion 24 b projecting beyond a corner of that member. Specifically, vertical edge surface 24b protrudes beyond the corner of the inner column member and engages a wall of the outer column member adjacent to that corner and parallel with the edge surface 24b of the strip.

Means are provided for urging each bearing strip outwardly into firm engagement with an inner wall surface of column member 12b. Such means, illustrated most clearly in FIG. 4, consists of a pair of wedge elements 28 which are spaced vertically apart and which taper towards each other. One of the inclined surfaces 28a of each wedge element engages the cylindrical surface of a stud 26 projecting into the interior of the inner column; the opposing surface 28b of the same wedge bears against a vertical shoulder 29 disposed within such column member. While the drawings reveal that the vertical shoulder 29 cooperating with each wedge is defined by a vertically extending plate 30 welded or otherwise permanently secured within the inner column, it is to be understood that such shoulder might instead be formed as an integral part of the inner column. The plate arrangement is particularly desirable, however, because of its simplicity and because the wall 31 of each such plate (i.e., the wall parallel with bearing strip 24 and spaced inwardly from the inner surface of the inner column member 12a) also serves to help retain each wedge 28 in place.

The wedge elements of each pair are urged towards each other by spring means in the form of helical tension spring 32. As shown in FIG. 4, the ends of the spring are hooked through openings 33 in the tapered end of each wedge element. As spring 32 urges each pair of wedge elements towards each other along the shoulders 29, studs 26 are urged outwardly (i.e., in the direction of the adjacent corner of the inner column member) to force the edge surface 24b of bearing strip 24 into firm contact with the outer column member.

The vertically elongated bearing strips are therefore self-adjusting in operation. It is to be noted that such strips travel only in outward directions, opposing movement in inward directions being prevented by the wedge elements 28 which in turn bear against shoulders 29. However, because of the substantial length of each bearing strip, outward movement for purposes of self-adjustment does not occur unless an irregularity or depression in the inner wall surface of the outer tubular member 12b is large enough to accommodate movement of the strip as a whole. Thus, the elongated bearing strips have been found particularly effective in situations where the use of self-adjusting rollers or ball bearings might cause damage.

The four bearing strips are staggered as shown in FIG. 3, the edge surface of each strip engaging a different wall of the outer tube along the corners of such tube. In the embodiment illustrated, where the outer tube 12b is stationary and the inner tube 12a is driven between raised and lowered positions, bearing strips 24 are disposed nearer the lower end of the inner tube. It is believed apparent, however, that if the inner tube were fixed to base 13 and the outer tube were the movable one, then the bearing strips 24 would be mounted upon the inner tube adjacent the upper end thereof.

While the inner and outer tubular members of the supporting column 12 are preferably formed of steel or some other metal having similar properties, particularly effective results have been obtained where bearing strips 24 are formed of nylon or other plastic material having similar properties of strength, toughness, and durability. The use of plastic provides quietness of operation and produces a self-lubricating effect. Also, the slight longitudinal flexibility of the plastic bearing strips is believed to increase the effectiveness of their performance without resulting in looseness or instability in any part of the unit.

While in the foregoing we have disclosed an embodiment of the invention in considerable detail for purposes of illustration it will be understood by those skilled in the art that many of these details may be varied without departing from the spirit and scope of the invention.

We claim:

1. An adjustable support column for tables and the like comprising a hollow outer tube of generally uniform cross section having substantially planar side walls meeting along a plurality of vertically-extending corners, a hollow inner tube of similar generally uniform cross section telescopingly received in said outer tube, one of said tubes being adapted for connection at its upper end to a table top or the like and the other of said tubes being adapted for connection at its lower end to a floor-engaging base, the external cross sectional dimensions of said inner tube being sufficiently smaller than the internal cross sectional dimensions of said outer tube to define a perimetric space therebetween, and a plurality of vertically-elongated bearing strips mounted upon said inner tube within said space and having vertical edge surfaces bearing against each of the inside surfaces of the walls of said outer tube adjacent the corners thereof, each of said strips extending along a plane parallel with one of said walls of said outer tube and having said vertical edge surface thereof bearing against a wall of said outer tube adjacent to said one wall.

2. The structure of claim 1 in which said inner and outer tubes are of generally rectangular cross section.

3. An adjustable support column for tables and the like comprising a hollow outer tube of generally uniform cross section having substantially planar side walls meeting along a plurality of vertically-extending corners, a hollow inner tube of similar generally uniform cross section telescopingly received in said outer tube, one of said tubes being adapted for connection at its upper end to a table top or the like and the other of said tubes being adapted for connection at its lower end to a floor-engaging base, the external cross sectional dimensions of said inner tube being sufficiently smaller than the internal cross sectional dimensions of said outer tube to define a perimetric space therebetween, a plurality of vertically-elongated bearing strips mounted upon said inner tube within said space and having vertical edge surfaces bearing against each of the inside surfaces of the walls of said outer tube adjacent the corners thereof, said bearing strips preventing direct sliding engagement between the walls of said inner and outer tubes, and means for urging said strips into firm contact with said inside surfaces.

4. An adjustable support column for tables and the like comprising a hollow outer tube of generally uniform cross section having substantially planar side walls meeting along a plurality of vertically-extending corners, a hollow inner tube of similar generally uniform cross section telescopingly received in said outer tube, one of said tubes being adapted for connection at its upper end to a table top or the like and the other of said tubes being adapted for connection at its lower end to a floor-engaging base, the external cross sectional dimensions of said inner tube being sufficiently smaller than the internal cross sectional dimensiosns of said outer tube to define a perimetric space therebetween, a plurality of vertically-elongated bearing strips mounted upon said inner tube within said space and having vertical edge surfaces bearing against each of the inside surfaces of the walls of said outer tube adjacent the corners thereof, and means for urging said strips into firm contact with said inside surfaces, said means comprising wedge means operatively interposed between each of said strips and shoulder surfaces of said inner tube, and spring means urging said wedge means in directions forcing each of said strips into firm contact with said outer tube.

5. The structure of claim 1 in which each of said vertically-elongated bearing strips is formed of plastic material, said vertical edge surfaces of said strips being straight.

6. An adjustable support column for tables and the like comprising a hollow outer tubular member of generally uniform rectangular cross section, said outer tubular member being open at its upper end, a hollow inner tubular member of generally uniform rectangular cross section telescopingly received in the open upper end of said outer member, the external cross sectional dimensions of said inner member being sufficiently smaller than the internal cross sectional dimensions of said outer members to define a perimetric space therebetween, a plurality of vertically-elongated bearing strips mounted upon said inner member within said space and having straight vertical edge surfaces bearing against the inside surfaces of each of the walls of said outer member adjacent the corners thereof, and means urging each of said strips in one direction into firm contact with said outer member and blocking the same against movement in a reverse direction, said bearing strips preventing direct sliding engagement between the walls of said inner and outer members.

7. An adjustable support column for tables and the like comprising a hollow outer tubular member of generally uniform rectangular cross section, said outer tubular member being open at its upper end, a hollow innter tubular member of generally uniform rectanngular cross section telescopingly received in the open upper end of said outer member, the external cross sectional dimensions of said inner member being sufficiently smaller than the internal cross sectional dimensions of said outer member to define a perimetric space therebetween, a plurality of vertically-elongated bearing strips mounted upon said inner member within said space and having straight vertical edge surfaces bearing against the inside surfaces of each of the walls of said outer member adjacent the corners thereof, and means urging each of said strips in one direction into firm contact with said outer member and blocking the same against movement in a reverse direction, said inner member being provided with a plurality of vertical shoulders, said means including wedges operatively interposed between said bearing strips and said shoulders, and spring means directing said wedges to urge each of said strips into firm contact with said outer member.

8. The structure of claim 7 in which each of said bearing strips extends vertically a substantial distance along the lower portion of said inner tubular member.

9. The structure of claim 8 in which each of said bearing strips is formed of plastic material.

10. An adjustable support column for tables and the like comprising a hollow outer tubular member of generally uniform rectangular cross section, a hollow inner tubular member of generally uniform rectangular cross section telescopingly received in said outer member, one of said tubular members being adapted for connection at its upper end to a table top and the other of said members being adapted for connection at its lower end to a supporting base, the external cross sectional dimensions of said inner tubular member being sufficiently smaller than the internal cross sectional dimensions of said outer member to define a perimetric space therebetween, a plurality of vertically-elongated bearing strips mounted upon said inner member within said space and having straight vertical edges bearing against the inside surfaces of each of the walls of said outer member adjacent the corners thereof, said inner tubular member having a plurality of vertical shoulders each extending along an inside wall surface thereof, said shoulders being generally parallel with said bearing strips and being spaced from the inside corners of said inner tubular member, each of said strips being provided adjacent the upper and lower ends thereof with a pair of parallel studs projecting into said inner tubular member through openings, therein said openings being disposed in each of the walls of said inner tubular member between said shoulders and one of said inside corners, and being larger horizontally than said studs for limited horizontal movement of each strip in a plane normal to the studs thereof, a pair of wedge elements disposed between and engaging the studs of each of the strips and an adjacent shoulder within said inner tubular member, and means urging said wedge elements along each shoulder to cam said studs towards the corners of said inner tubular member and thereby direct the edges of said bearing strips into firm engagement with the inside corners of said outer tubular member.

11. The structure of claim 10 in which said wedge elements of each pair taper towards each other, said means urging said wedge elements of each pair towards each other to cam said studs towards the corners of said inner tubular member.

12. The structure of claim 11 in which said means comprises a plurality of tension springs, each spring being disposed between and being connected to a pair of said wedge elements.

* * * * *